US009772883B2

(12) United States Patent
Abuelsaad et al.

(10) Patent No.: US 9,772,883 B2
(45) Date of Patent: Sep. 26, 2017

(54) DEVICE OPERABILITY ENHANCEMENT WITH ALTERNATIVE DEVICE UTILIZATION

(71) Applicant: INTERNATIONAL BUSINESS MACHINES CORPORATION, Armonk, NY (US)

(72) Inventors: Tamer E. Abuelsaad, Somers, NY (US); Gregory J. Boss, Saginaw, MI (US); Clifford A. Pickover, Yorktown Heights, NY (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 14/696,876

(22) Filed: Apr. 27, 2015

(65) Prior Publication Data
US 2015/0227395 A1    Aug. 13, 2015

Related U.S. Application Data

(62) Division of application No. 13/631,132, filed on Sep. 28, 2012, now Pat. No. 9,052,964.

(51) Int. Cl.
*H04L 12/18* (2006.01)
*G06F 9/50* (2006.01)
(Continued)

(52) U.S. Cl.
CPC .......... *G06F 9/5061* (2013.01); *G06F 9/5072* (2013.01); *G06F 13/10* (2013.01);
(Continued)

(58) Field of Classification Search
None
See application file for complete search history.

(56) References Cited

U.S. PATENT DOCUMENTS 7,407,108 B1  8/2008 Euler et al.
7,492,737 B1  2/2009 Fong et al.
(Continued)

OTHER PUBLICATIONS

Maniatis et al. "Dynamic resource management for QoS provisioning over next-generation IP-based wireless networks", Computer Communications 29 (2006), pp. 730-740.
(Continued)

*Primary Examiner* — Henry Tsai
*Assistant Examiner* — Christopher Bartels
(74) *Attorney, Agent, or Firm* — Lisa Ulrich; Andrew M. Calderon; Roberts Mlotkowski Safran Cole & Calderon, P.C.

(57) ABSTRACT

An approach is disclosed for enhancing mobile-device operation by resource sharing and/or pooling. The approach can be implemented in a computer infrastructure having computer executable code tangibly embodied on a computer readable storage medium having programming instructions operable to trigger a first device to share content or request functionality of any of a plurality of other devices. The programming instructions can further be operable to discover a candidate device that is capable of receiving the content or a request to provide the functionality. The programming instructions can further be operable to determine that the candidate device can receive the content or provide the functionality based on predetermined criteria. The programming instructions can further be operable to establish a connection with the candidate device. The programming instructions can further be operable to send the content from the first device to the candidate device or receive functionality from the candidate device.

12 Claims, 6 Drawing Sheets

(51) Int. Cl.
*G06F 13/10* (2006.01)
*H04L 29/08* (2006.01)
*H04W 52/02* (2009.01)
*H04L 12/26* (2006.01)

(52) U.S. Cl.
CPC ............ H04L 67/14 (2013.01); *G06F 9/5044* (2013.01); *G06F 9/5055* (2013.01); *G06F 9/5094* (2013.01); *G06F 2209/509* (2013.01); *H04L 12/1827* (2013.01); *H04L 29/08576* (2013.01); *H04L 43/00* (2013.01); *H04W 52/0261* (2013.01); *Y02B 60/1292* (2013.01); *Y02B 60/142* (2013.01); *Y02B 60/50* (2013.01)

(56) References Cited

U.S. PATENT DOCUMENTS

| | | |
|---|---|---|
| 7,967,212 B1 | 6/2011 | Euler et al. |
| 8,036,690 B1 | 10/2011 | Delker et al. |
| 8,458,255 B2 | 6/2013 | Takeuchi |
| 8,473,550 B2 | 6/2013 | Nguyen et al. |
| 8,533,103 B1 * | 9/2013 | Certain .................. G06Q 10/06 705/35 |
| 8,612,330 B1 * | 12/2013 | Certain .................. G06Q 30/06 705/37 |
| 8,694,400 B1 * | 4/2014 | Certain .................. G06Q 30/08 705/26.3 |
| 8,984,243 B1 * | 3/2015 | Chen ....................... G06F 3/065 711/162 |
| 2005/0122946 A1 | 6/2005 | Won |
| 2008/0015807 A1 | 1/2008 | Hong |
| 2008/0318642 A1 | 12/2008 | Tanaka |
| 2011/0047539 A1 * | 2/2011 | Reunamaki ............... G06F 8/60 717/174 |
| 2011/0113097 A1 | 5/2011 | Takeuchi |
| 2011/0191771 A1 | 8/2011 | Balassanian |
| 2011/0238546 A1 * | 9/2011 | Certain .................. G06Q 10/00 705/34 |
| 2012/0102139 A1 | 4/2012 | Tran et al. |
| 2012/0158846 A1 | 6/2012 | Linder |
| 2014/0095601 A1 * | 4/2014 | Abuelsaad ........... G06F 9/5072 709/204 |

OTHER PUBLICATIONS

Park et al. "Design and implementation of Glint-side caching service for mobile device", ICIC Express Letters, Part B: Applications, v 2, n 2, Apr. 2011, Abstract 1 page.

Jung et al. "User-Profile-Driven Collaborative Bandwidth Sharing on Mobile Phones", MCS'10, Jun. 15, 2012, San Francisco, USA, 9 pages.

Rudenko et al_ "Saving Portable Computer Battery Power through Remote Process Execution", Mobile Computing and Communications Review, vol. 2, No. 1, pp. 19-26, (date unknown, uploaded 2011 )_.

Caituiro-Monge et al. "Friend Relay: A Resource Sharing Framework for Mobile Wireless Devices", WMASH'06, Sep. 29, 2006, Los Angeles, California, USA, pp. 20-29_.

Vallina-Rodriguez et al. "Enabling Opportunistic Resources Sharing on Mobile Operating Systems: Benefits and Challenges", S3'11, Sep. 19, 2011, Las Vegas, Nevada, USA, 3 pages_.

Carroll et aL"An Analysis of Power Consumption in a Smartphone", NICTA, University of New South Wales and Open Kernel Labs, 14 pages, (date unknown, uploaded 2011 )_.

* cited by examiner

DEVICE OPERABILITY ENHANCEMENT WITH ALTERNATIVE DEVICE UTILIZATION

FIELD OF THE INVENTION

The present invention generally relates to enhancement of device operability and/or resources, and more particularly, to methods and systems for enhancing mobile-device operation by resource sharing and/or pooling.

BACKGROUND

Smartphones and personal digital assistants and other mobile devices are popular amongst those who wish to use some of the powers of a conventional computer, in environments where carrying such computer would not be practical. Also, enterprise digital assistants can further extend the available functionality for the business user by offering integrated data capture devices like barcode, RFID and smart card readers. Unfortunately, such devices tend to have limited battery power and hardware functionality.

For example, mobile devices often become low on battery charge, and, thus, effectively reducing the capabilities and functionality of such devices. For example, as the battery power fails, content such as media, video, etc. can be lost. Also, mobile devices can be limited in their capabilities due to their processing capabilities, applications, or hardware implementations.

SUMMARY

In a first aspect of the invention, a method is implemented in a computer infrastructure having computer executable code tangibly embodied on a computer readable storage medium having programming instructions operable to trigger a first device to share content or request functionality of any of a plurality of other devices. discover a candidate device of the plurality of devices that is capable of receiving the content or a request to provide the functionality. The programming instructions is further operable to discover a candidate device that is capable of receiving the content or a request to provide the functionality. The programming instructions is further operable to determine that the candidate device can receive the content or provide the functionality based on predetermined criteria. The programming instructions is further operable to establish a connection with the candidate device. The programming instructions is further operable to send the content from the first device to the candidate device or receive functionality from the candidate device.

In another aspect of the invention, a system is implemented in hardware and comprises a service sharing module operable to at least one of: discover a candidate device that is capable of receiving content from a first device or a request to provide functionality to the first device; determine that the candidate device meets predetermined criteria to receive the content or provide the functionality; and send the content from the first device to the candidate device or receive functionality from the candidate device.

In a further aspect of the invention, a computer system comprises a CPU, a computer readable memory and a computer readable storage media. First program instructions initiate a discovery process to find devices that can contribute to a shared resource pool. Second program instructions select a discovered candidate master device for providing a requested functionality for use in the shared resource pool. Third program instructions transfer a role to the selected candidate master device. Fourth program instructions provide a validation process to ensure that the selected candidate master device remains valid. The first, second, third and fourth program instructions are stored on the computer readable storage media for execution by the CPU via the computer readable memory.

In an additional aspect of the invention, a computer program product comprises a computer usable storage medium having readable program code embodied in the storage medium. The computer program product includes at least one component operable to: trigger a first mobile device to query other devices in possible need of functionality including services or sharing of content; discover a mobile device that requires the functionality; establish a connection with the mobile device when the first mobile device meets or exceeds a predetermined criteria based on a comparison of device performance; and share the functionality amongst the first mobile device and the mobile device when the first mobile device meets or exceeds the predetermined criteria In another aspect of the invention, a method of deploying a system for sharing content or requesting functionality comprises providing a computer infrastructure, being operable to: determine, in a first device, a battery level is below a threshold level or is forecasted to be below the threshold level; trigger the first device to discover other devices within a locality, when the battery level is below a threshold; discover a candidate device within the locality that has adequate power supply and which is capable of displaying content of the first device; and transfer the content from the first device to the candidate device.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
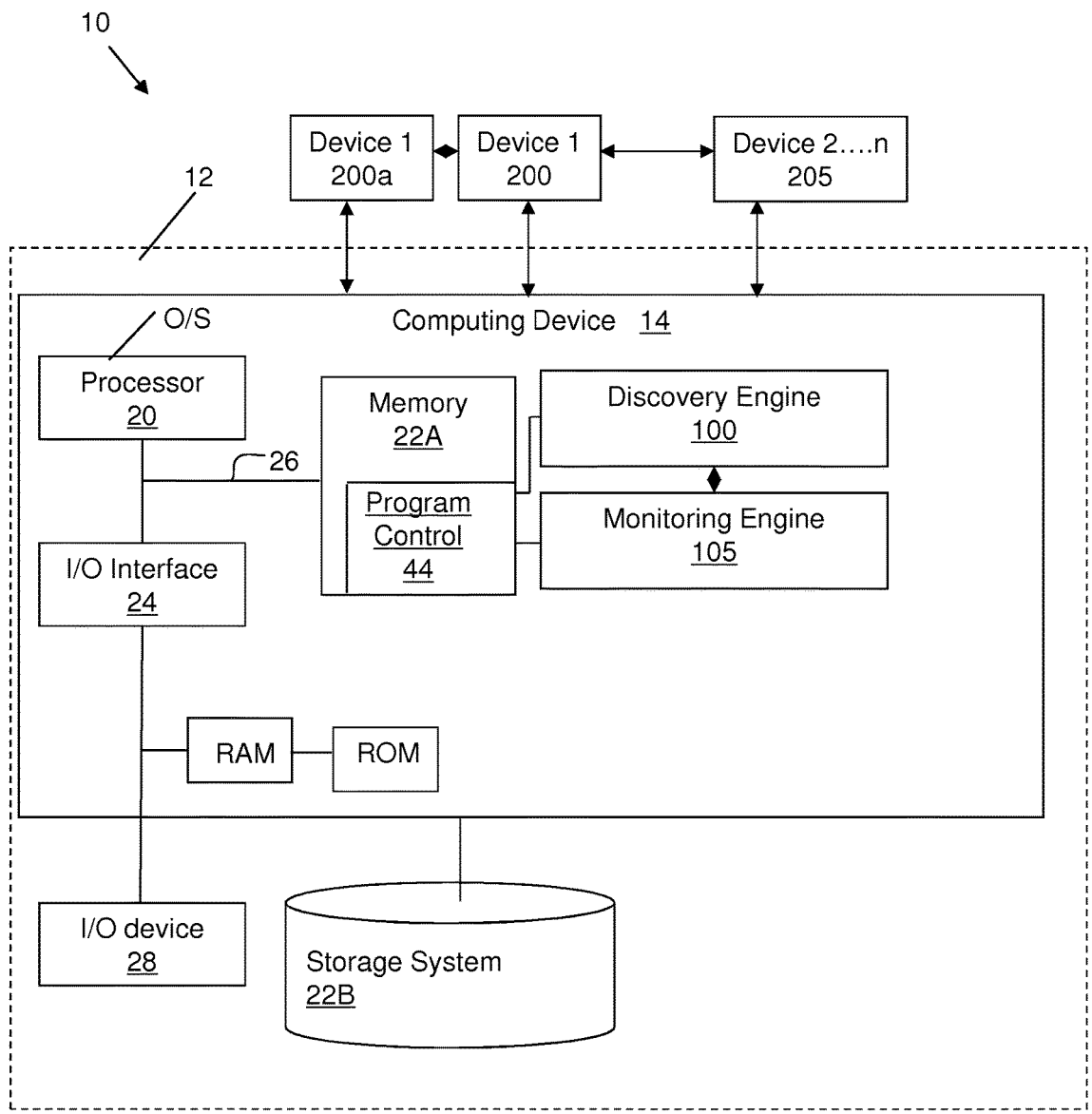
FIG. 1 is an illustrative environment for implementing steps in accordance with aspects of the invention.

The present invention generally relates to enhancement of device operability and/or resources, and more particularly, to methods and systems for enhancing mobile-device operation by resource sharing and/or pooling. In more specific embodiments, the present invention can share resources amongst different devices, and more particularly, can implement multi-point resource pooling and content sharing amongst many devices. Advantageously, the methods and systems of the present invention can automatically redirect services, core functions or capabilities (e.g. content, services, e.g., location based services, functionality, etc.) to different devices, based on device functionality, battery level and/or other criteria, thereby enhancing device operability and/or efficient resource utilization. It should be understood by those of skill in the art that the terms "services" and "functionality" and derivations thereof, can be used interchangeably within the instant disclosure.

By way of specific embodiments, for example, a device which has a low battery level can transfer content, services or other functionality to a device with adequate battery resources, thus ensuring continuity of a presentation or services prior to the originating device losing power. For example, it is not uncommon for users or set of users to possess different mobile devices with varying battery levels. In order to effectively use these devices, the methods and systems of the present invention can automatically deliver content (or redirect services or functionality) from a first device with a low battery level to a second device, which currently has an adequate power supply, e.g., higher battery levels. In this way, the present invention can transfer content or redirect services in order to effectively provide better resource allocation amongst the different devices. In embodiments, this can be accomplished by automatically triggering redirection of content or a service to a detected secondary device, based on such criteria as, for example, a low battery charge level on the originating device.

In another specific embodiment, for example, it is not uncommon for users or set of users to possess mobile devices with varying core capabilities and/or functionality, e.g., services or quality of network connectivity as examples. By utilizing the present invention, the methods and systems provided herein can utilize specific devices for specific tasks, hardware and/or core functionalities, e.g., pool resources of two or more devices. By way of example, resources that require location based services, e.g., GPS, can be allocated to a device with the best network connectivity; while other services are performed on another device, e.g., text messaging a specific establishment that was found with the location based services of another device. In this way, devices with poor quality of service can request another device to perform specific services and share these resources amongst many devices. Thus, devices with different core functionality (e.g., both capabilities and device quality) and quality of service (e.g., communication quality over a network) can be utilized more efficiently and effectively. In embodiments, this can be accomplished by requesting a service or functionality to be performed by a detected secondary device, based on such criteria as, for example, quality of services or functionality presented on the secondary device, as examples.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a discovery engine 100 and a monitoring engine 105, e.g., the processes described herein. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The discovery engine 100 and monitoring engine 105 can be implemented as one or more program code in the program control 44 stored in memory 22A as separate or combined modules. Additionally, the discovery engine 100 and a monitoring engine 105 may be implemented as separate dedicated processors or a single or several processors to provide the function of these tools. The discovery engine 100 and monitoring engine 105 may be implemented as a service, by a service provider, using the environment 10 of FIG. 1. Alternatively or in addition, the discovery engine 100 and monitoring engine 105 may be implemented on any device, 200a, 200 or 205, which may (or may not) be in communication with the environment 10, and more particularly, the computing device 14. In embodiments, the devices 200a, 200 and 205 may be any combination of mobile computers, smart phones, tablet computers, PDAs, calculators, handheld game devices, portable media player, cameras video devices, pagers, etc.

In embodiments, the discovery engine 100 can discover candidate devices, e.g., devices 200, 205 (e.g., nearby devices such as smart phones and personal computers), which can provide the requested services or display content that is originally displayed or provided by an originating device 200a. The discovery engine 100 can, in embodiments, prompt the device user of the originating device 200a (unless a default configuration exists) to be export the content or request services, functionality, and/or hardware of another device based on the capabilities of the candidate devices 200, 205 found during the detection phase. In embodiments, the discovery engine 100 can prioritize the candidate devices 200, 205 by an analysis of power-saving features and/or available core functionality and/or available services. In further embodiments, after selection of service(s) or content to be exported to the candidate devices, e.g., devices 200, 205, depending on the service/feature being consumed, the selected candidate device, e.g., device 205, can display the content from the originating device 200a, or provide certain services or functionality requested by the originating device 200a.

In implementation, the content can be streamed wirelessly to the remote device (e.g. raw video output) by a service provider, e.g., through the environment 10. In further embodiments, the content from the originating device 200a can also be streamed directly to the selected candidate device, e.g., devices 200, 205. In further embodiments, the originating device 200a can also request that some functionality be performed on the selected candidate device, e.g., devices 200, 205.

In implementing embodiments of the present invention, the selected candidate device, e.g., devices 200, 205, can display a degraded (or simplified) display content, which is streamed wirelessly to the remote, selected candidate device, e.g., devices 200, 205. In alternate embodiments, the selected candidate device, e.g., devices 200, 205, can receive a URL, for example, or a signal to obtain the content from a service, e.g., content provider, via a wireless connection, Internet or other networked system. In embodiments, the content can also be sent from the originating device 200a to a network storage device, e.g., storage system 22B which can then be retrieved by the selected candidate device, e.g., devices 200, 205, through a network computing system, e.g., cloud computing. In still further alternative embodiments, the content can first be uploaded to a networked storage device, and then automatically streamed to the selected candidate device, e.g., device 205. In embodiments, the content can be, for example, a presentation, music, video or other content as may be provided by the originating device 200a. in embodiments, services and/or functionality may be related to hardware devices such as the use of a camera, etc.

The monitoring engine 105, on the other hand, can provide monitoring of any device. For example, the monitoring engine 105 can be used to determine a battery level of the devices 200a, 200, 205. For example, the monitoring engine 105 can determine when a battery level of any of the devices is below a threshold value. In this way, the monitoring engine 105 can trigger the discovery engine 100 to perform its processes, when a battery level is low on an originating device 200a. In further embodiments, the monitoring engine 105 can also assist the discovery engine 100, by informing the discovery engine 105 that a candidate device may also have a low battery level. In this situation, the discovery engine 100 may select an alternate candidate device, or alternatively, the discovery engine 100 can make a determination as to which candidate device would be selected based on its respective power reserves.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
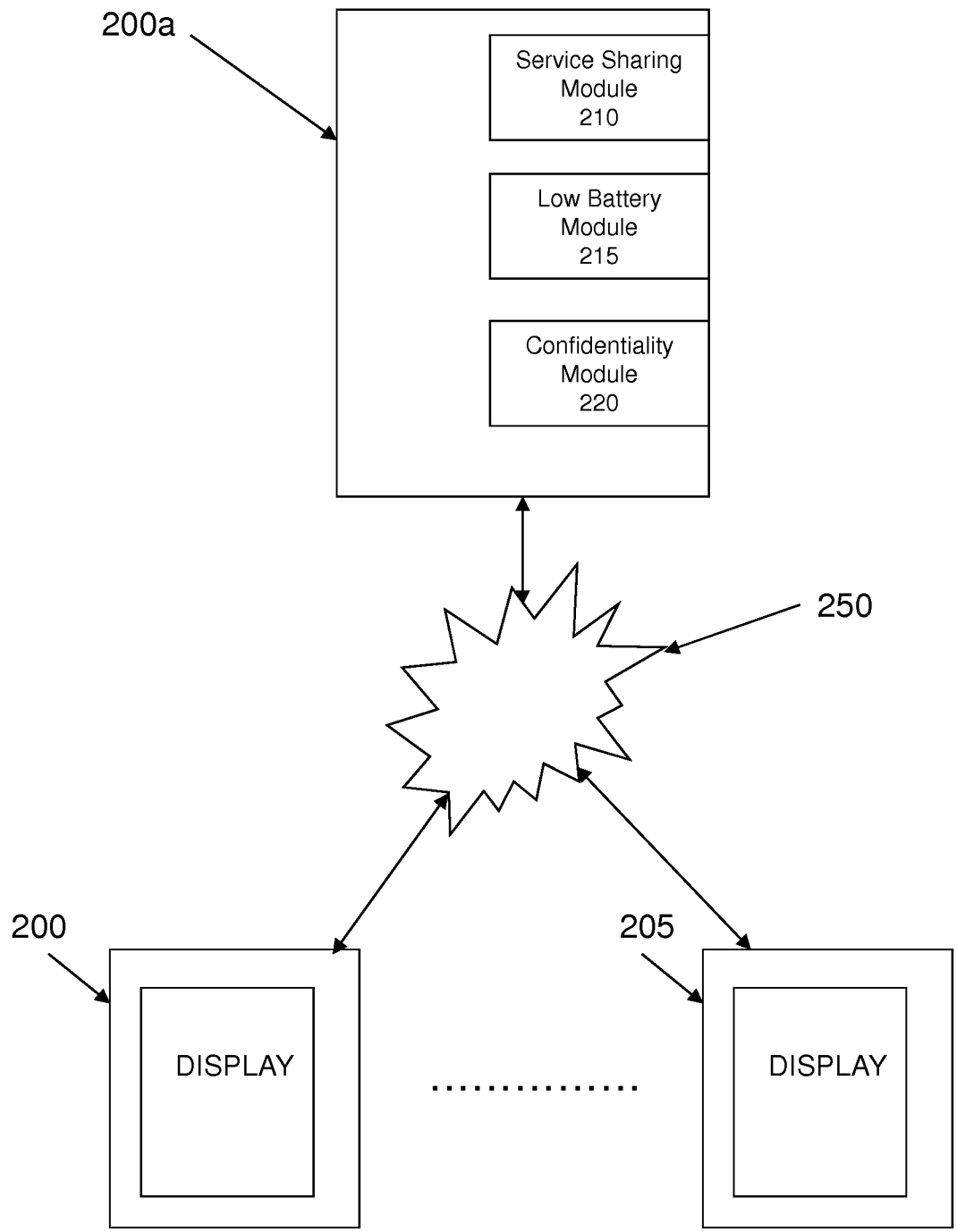
FIG. 2 shows an illustration of devices and related core functionality in accordance with aspects of the present invention.

FIG. 2 shows an illustration of devices and related core functionality in accordance with aspects of the present invention. More specifically, FIG. 2 shows an originating device 200a, and one or more candidate devices, 200 and 205. In embodiments, the originating device 200a and one or more candidate devices 200, 205 are in communication with one another through a network connection 250. In embodiments, the network connection 250 can be representative of the environment 10 or computing device 14, shown in FIG. 1. Alternatively, the network connection 250 can be the Internet or other networked connection provided by a service provider. In embodiments, the service provider, such as a Solution Integrator, could offer to perform the processes described herein. In this case, the service provider can create, maintain, deploy, support, etc., the computer infrastructure that performs the process steps of the invention for one or more customers. These customers may be, for example, any user that provides or displays content, or receives services or functionality on a computing device. In return, the service provider can receive payment from the customer(s) under a subscription and/or fee agreement and/or the service provider can receive payment from the sale of advertising content to one or more third parties.

As should be understood by those of skill in the art, the devices 200a, 200 and 205 can be any computing device. For example, the devices can be mobile devices such as, for example, laptop computing devices, tablets or other portable devices such as smart phones or other smart devices. In any scenario, it should also be understood by those of skill in the art that each of the devices 200a, 200 and 205 can be the same or different devices, or any combination thereof. Also, each of these devices 200a, 200 and 205 can include the same or different functionality and/or services, as well as have the same or different performance levels, battery power, etc. By way of example, any combination of the devices 200a, 200 and 205 can include the functionality as represented by device 200a.

By way of examples, device 200a includes a service sharing module 210, a low battery module 215 and a confidentiality module 220. In embodiments, the service sharing module 210 may include, for example, the discovery module shown in FIG. 1. The service sharing module 210 may also include additional functionality such as, for example, amongst other functions:

(i) determining which content to share amongst devices;

(ii) determining how to display the content on the selected device(s), e.g., degraded content, full content, selected content, etc.;

(iii) determining and/or executing the processes in which to share the content, e.g., stream the content directly to the other devices or through a network, upload the content into a storage system on the cloud or other networking infrastructure, while alerting the other device that content is available, etc.;

(iv) determining that other devices can handle the content and have adequate battery power;

(v) determining services and/or functionality that is available on other devices by, for example, pinging other devices for such information;

(vi) determining and/or executing which services and/or functionality to hand off to other selected devices;

(vii) informing another device of transfer of content and/or request for functionality and/or services; and/or (viii) opening up communication channels amongst the different devices.

The low battery module 215, on the other hand, may include the functionality of the monitoring engine 105 of FIG. 1. For example, the low battery module 215 may determine the battery level of the originating device 200a, and/or any of the candidate devices 200, 205. Also, the low battery module 215 may determine the battery level of any of the devices, against a threshold value; that is, if the low battery module 215 determines that a battery level of the originating device 200a is below a certain threshold, it will trigger the service sharing module 210 (e.g., discovery module) to perform its processes. In embodiments, the triggering event for sharing content, services and/or functionality amongst devices can be, for example, any combination of low power the originating device, manual selection on the originating device, automatic detection of better properties (e.g., display, network connection, etc.) on candidate device, and/or a state in which a battery level on the candidate device is greater than a battery level on the originating device.

In embodiments, the low battery module 215 can have a forecasting component, which will forecast when power will fall below a certain threshold within a certain amount of time T, and based on this forecast, begin the discovery process (and/or the transfer process). This forecast may be based on any of the following: an analysis of past user history of power associated with one or more applications, an analysis of current linear or nonlinear rate of power level decay for the device, an analysis of power use on the candidate device, a forecast of power use on the candidate device, an analysis of other users' power level decay when using the same or similar applications and devices, etc.

The confidentiality module 220 can be implemented on any of the devices to determine sensitive information. For example, the confidentiality module 220 can determine that certain content is sensitive and such content should not be shared amongst the devices. In further embodiments, the confidentiality module 220 can flag the user that certain content may be sensitive, and then allow the user to make the determination as to whether such content can be shared amongst any combination of the devices. In further embodiments, the confidentiality module 220 can determine whether portions of the content are sensitive subject matter, and hence begin a redacting process as an example. Alternatively or in addition, if content is found to be sensitive subject matter, the confidentiality module 220 can flag such content for the user's review, prior to sending such content to another device.

Flow Diagram

FIGS. 3-7 show exemplary flows for performing aspects of the present invention. The steps of FIGS. 3-7 may be implemented in the environment of FIG. 1, for example, or the system diagram of FIG. 2.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1 and/or 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 3:
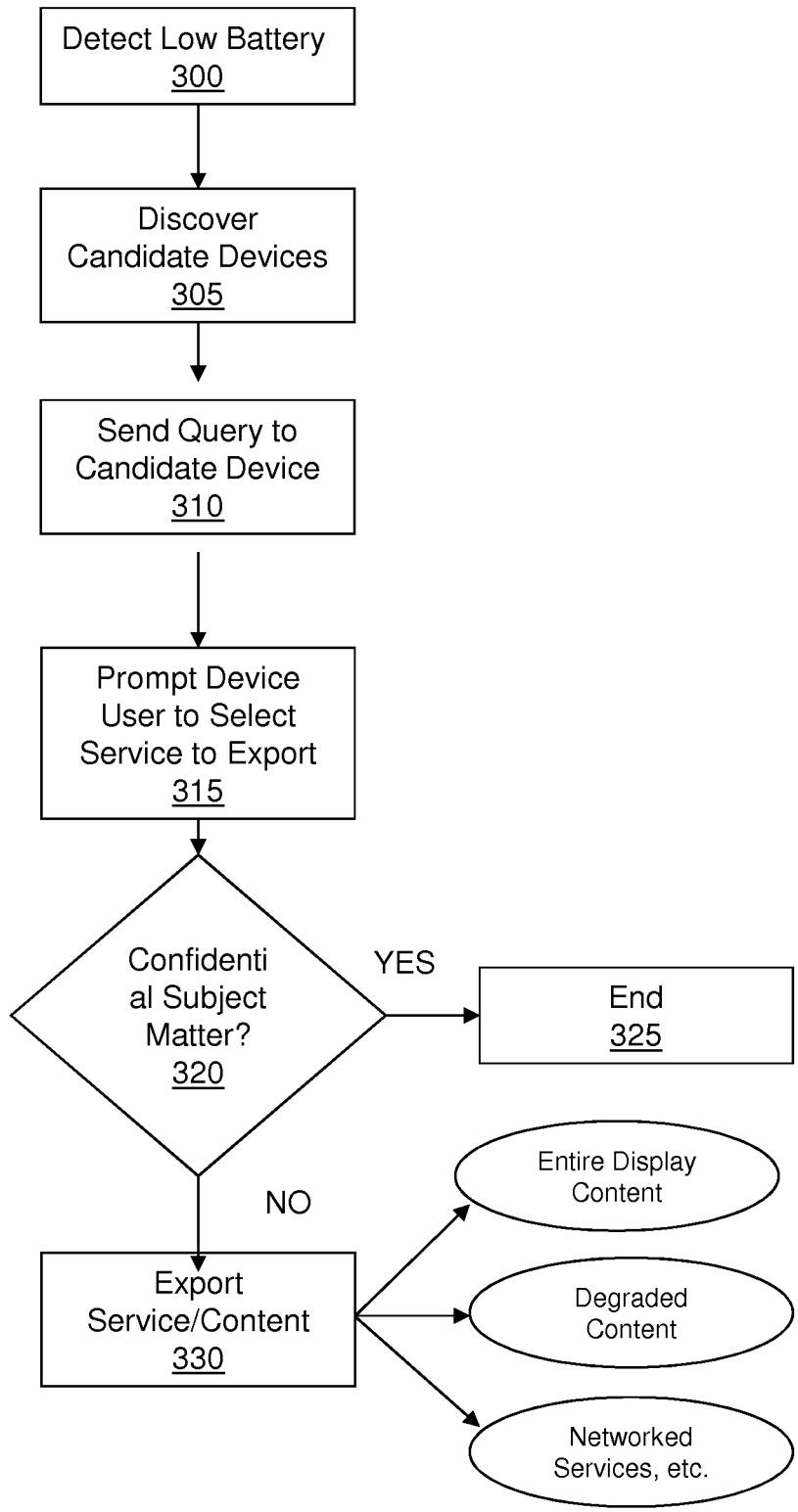
FIG. 3 shows an exemplary overall flow process in accordance with aspects of the present invention.

FIG. 3 shows an exemplary overall flow process in accordance with aspects of the present invention. At step 300, the systems and/or processes of the present invention detect a low battery level. In embodiments, this can be performed by comparing the battery level of a device, e.g., originating device, to a threshold level. In alternative embodiments, the systems and/or processes may forecast when a device will fall below the threshold value, as discussed above. It should be understood by those of skill in the art that other triggering events may also be used to begin the processes of the present invention, e.g., transfer or share content and/or request services or functionality of another device for pooling of resources. These triggering events can be, in any of the embodiments described herein, any combination of low power the originating device, manual selection on the originating device, automatic detection of better properties (e.g., display, network connection, etc.) on candidate device, and/or a state in which a battery level on the candidate device is greater than a battery level on the originating device.

At step 305, the systems and/or processes of the present invention will discover candidate devices. This can occur when the battery of the originating device is low, falls below a threshold, or is forecasted to fall below a threshold, as examples. In examples, this discovery can be provided by various different mechanisms such as, for example, (i) reviewing a calendar and/or address book of the originating device (which can be performed by a service provider or the originating device), for friends and/or colleagues which may be in a same meeting or networked with the originating device and/or within a certain, predetermined location and/or distance from the originating device;

(ii) checking social networks or other services of a service provider for friends and/or colleagues or other devices within a certain, predetermined location and/or distance from the originating device; and/or (iii) checking Wi-Fi networks to find candidate devices which are within a certain, predetermined location and/or distance from the originating device.

Next, at step 310, a query is sent to obtain the power states of the candidate devices, as well as which devices are willing and/or capable to receive content and/or perform services and/or pool their resources with the originating device. In embodiments, a determination can also be made as to the display quality of any potential candidate device, as such information may be used to determine which device will receive content or perform certain services and/or functionality. In additional or alternate embodiments, a determination may also be made as to whether the functionality and/or services of the potential candidate device meet or exceed a certain threshold, e.g., the functionality and/or services already provided on the originating device, as such information may also be used to determine which device will receive a request for services and/or pooling information.

At step 315, the systems and/or processes of the present invention will prompt the user of the originating device (unless default configuration exists) of services and/or content that can be exported based on candidate devices found and their capabilities. In embodiments, the list of services and candidate devices can be prioritized by an analysis of power-saving features, quality of service or other criteria.

At optional step 320, a determination is made as to whether content to be transferred is sensitive subject matter, e.g., confidential. If so, the processes will end at step 325. Alternatively, such sensitive subject matter can be flagged for review by the user of the originating device, in order to make a determination as to whether export of such content will be effectuated by the processes of the present invention.

At step 330, if the content can be exported, the systems and/or processes of the present invention will export the content (and/or request to perform certain services and/or functionality) to the candidate devices. By way of example, any combination of the following can be performed at this stage:

(i) the entire display content is streamed wirelessly to the selected, candidate device(s) (e.g., raw video output);

(ii) a degraded (or simplified) display content is streamed wirelessly to the selected, candidate device(s);

(iii) the selected, candidate device(s) is signaled or provided with a URL to obtain the content from another source, via a networked connection. This can be on storage system or a webpage, for example;

(iv) the source content is uploaded to a storage system, e.g., storage system 22B of FIG. 1, and then redirected to the selected, candidate device(s); and/or (v) opening a data channel over a protocol, e.g., SMS.

By way of examples, different methods of exporting content and/or requesting services and/or functionality to be performed are contemplated by the present invention. For example, the following methods are contemplated by the present invention, by way of non-limiting examples.

Transfer Content Directly to an Alternate Device:

As part of the process, the systems and/or processes of the present invention may shut down a user's screen in order to preserve battery power. The systems and/or processes of the present invention can then provide the content for display on the selected candidate device, via any networked connection. Although the selected candidate device may still be active and available for some functions, the recipient device (e.g., selected candidate device) may be used to view or display the content of the originating device or perform other functions.

Transfer Functions to an Alternative Device:

In an alternate embodiment, the originating device, e.g., smart phone, need not actually transfer content (e.g., display content or multimedia content) from the originating device to the selected candidate device (e.g., a nearby smart phone), when the battery of the originating device is low. Instead, the originating device can send a signal to a service provider that then pushes the multimedia or other content to the selected candidate device. One advantage of this alternate embodiment is that it is less energy intensive, since the originating device does not need to continually send content to the selected candidate device.

By way of example, user "A" is watching a video on smart phone "1", which is low on battery power. User "B" is nearby and watching the video with user "A". A trigger from the device of user "A" sends a signal to a service provider which pauses the video on the device of user "A", then pushes the same video to the device of user "B", with the permission of user "B". The device of user "A" can then go into a low power mode (e.g., sleep mode with the screen off).

Transfer Content to a Service Provider to Consumer Resources of Another Device:

In an alternate embodiment, an originating device can upload specific data elements of interest into a shared environment (e.g., such as a cloud or other shared storage environment accessible by devices). Once uploaded, the selected candidate device may access the shared content from any compatible device to continue productive use or update. Note that the specific data element of interest may be determined manually (e.g. by user input) or automatically (e.g., through a user profile, an analysis of power usage, etc.)

Method to Mount Drive for File Content Sharing:

In an alternate embodiment, the originating device enables file sharing through a wireless network. In this model, the originating device simply exposes a secure network file server via available wireless protocols. Using a second device, e.g., selected candidate device, the user of the second device then accesses the data of the originating device via a network file server protocol. The user can then either store it locally or update it on the first device as desired (as long as the first device has conserved enough power to still be accessible).

Method to Send and Receive Content Over Data Channel:

In an alternate embodiment, the originating device continues to provide capabilities such as providing access to email or a music library while delegating the application presentation and processing to a second device, e.g., selected candidate device. In implementation, the originating device can open a channel over a wireless communication path such as Wi-Fi or other known communication channels. The selected candidate device accepts the request and activates the application in a remote data mode. The user of the selected candidate device can interact through the device while taking advantage of core content in the originating device. The set of features from the originating device which may be shared would comprise an intersection of feature capabilities between the both devices.

Figure 4:
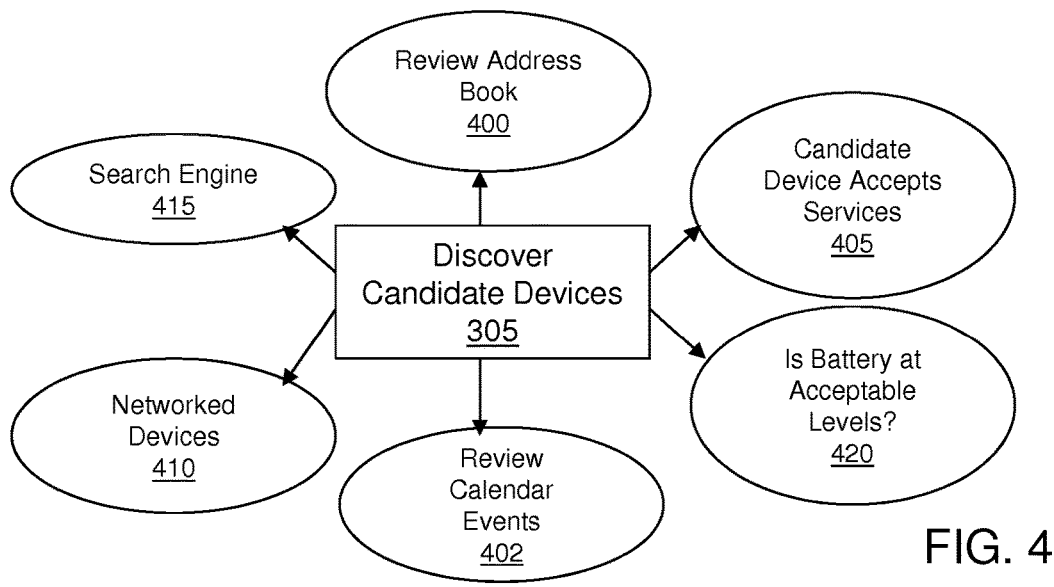
FIG. 4 shows a graphical representation of a discovery process in accordance with aspects of the present invention.

FIG. 4 shows a graphical representation of a discovery process in accordance with aspects of the present invention. As described above, the discovery process can be implemented to discover candidate devices (step 305) (or master devices to perform services or functionality in a pooling arrangement). Many methods of discovery are contemplated by the present invention which may include, for example, reviewing the address book 400 or calendar events 402 on the originating device. This scanning or reviewing process can assist in determining which candidate devices are acceptable recipients of the content and/or request for services, functionality and/or resource pooling. For example, devices listed within the address book or calendar events may be acceptable candidates. Alternatively, some of the devices listed in the address book or calendar events may be flagged as preferred candidates, or non-acceptable candidates depending on the content, or request for services, functionality and/or resource pooling arrangements.

As further shown in FIG. 4, the discovery process may also determine which candidates are acceptable for receiving certain content, request for services, functionality and/or resource pooling 405. This can be implemented by querying local devices, or devices within a certain location and/or certain distance from the originating device, and determining their capabilities, power levels 420, or other requested criteria, so to make such determinations. In embodiments, the discovery process can also ping networked devices over a network 410, or use search engines (or social networking environments) to determine which devices are compatible and within a certain geographical area of interest 415. Of course, the above are only provided as examples, and that other discovery methods are also contemplated by the present invention.

Figure 5:
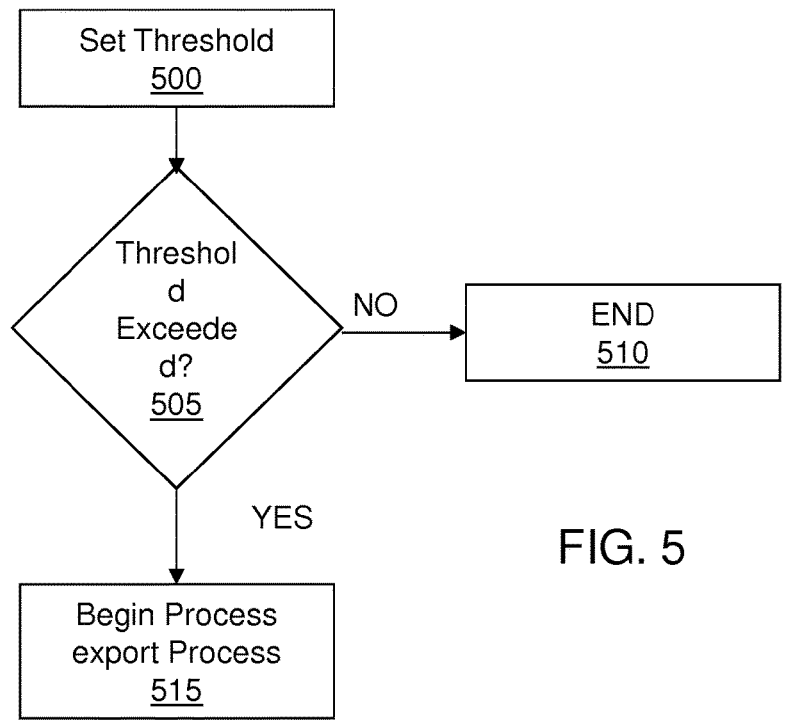
FIG. 5 shows an exemplary flow process for utilizing device battery level thresholds in accordance with aspects of the present invention.

FIG. 5 shows an exemplary flow process for utilizing device battery level thresholds in accordance with aspects of the present invention. At step 500, a certain battery threshold is set by a user or service provider. The threshold can be any battery level desired for certain applications, content, or other functionality required for certain tasks. In this way, different thresholds can be set for different functions, content, requests, or pooling of services. For example, a user profile may include a multi-tier profile model that allows the discovery process to differentiate at what level of battery power to present options to the user based on the quality of the alternative device. For instance, the systems and processes of the present invention may prompt the user when the battery is still at 50% if a fully compatible wired device is available (including a desktop or a charging mobile, etc.); whereas it will not present options until 20% if the alternative device is also battery based and requires reduced capabilities for services.

At step 505, a determination is made as to whether the threshold has been exceeded. In embodiments, it is also contemplated that the present invention can forecast when certain thresholds may be exceeded, based on time, functions and/or services being implemented, hardware devices, etc., as described herein. More specifically, the forecast may be based on any combination of the following: an analysis of past user history of power associated with one or more applications, an analysis of current linear or nonlinear rate of power level decay for the device, an analysis of power use on the candidate device, a forecast of power use on the candidate device, an analysis of other users' power level decay when using the same or similar applications and devices, etc. In this way, it is possible to start the discovery process in anticipation of a low battery level. When the threshold is met, or the forecast anticipates a low battery threshold will be met at time, T, at step 515, the discovery and export process can begin (as described, e.g., with reference to FIG. 3).

Figure 6:
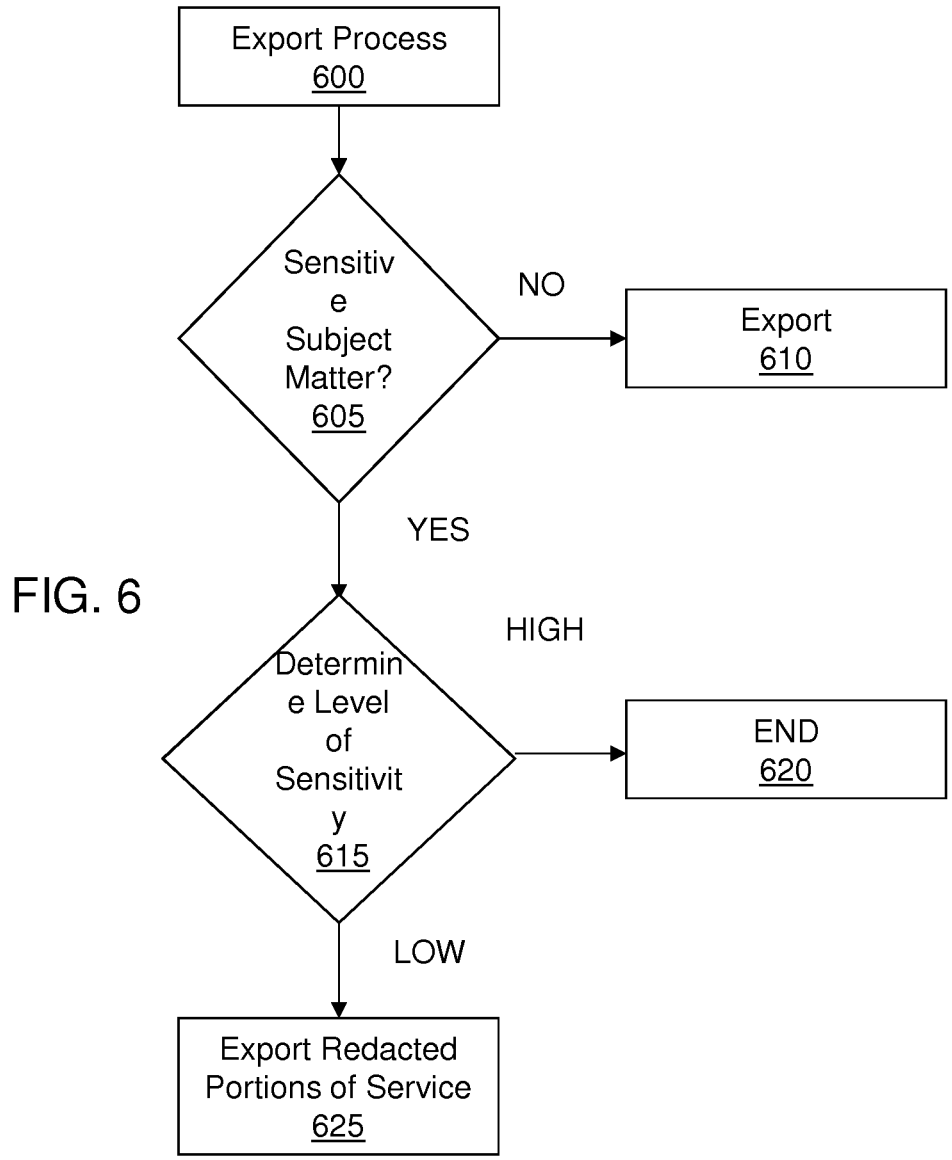
FIG. 6 shows an exemplary flow process for sharing sensitive or confidential subject matter in accordance with aspects of the present invention.

FIG. 6 shows an exemplary flow process for sharing sensitive or confidential subject matter in accordance with aspects of the present invention. At step 600, the export process of the present invention begins. At step 605, a determination is made as to whether sensitive subject matter, e.g., content, is to be exported. This can be implemented in many different ways, as contemplated by the present invention. For example, the content can be provided with a flag when confidential information is contained within the content. Alternatively, it is possible to scan the content for certain words, phrases, etc., which are preselected as being confidential or sensitive subject matter. If no confidential information is found, the export process can continue at step 610. If confidential or sensitive subject matter is found, at step 615, a level of sensitivity can be determined. This can be determined by a user viewing the content, flags provided on some of the content, or an automatic comparison of the selected content to a known list of sensitive subject matter, to name a few illustrative methods contemplated by the present invention.

It should be understood by those of skill in the art that security concerns motivate the use of a secure protocol for information exchange. More generally, security is a motivating factor for use of pooling arrangements and sharing or transferring of content amongst devices and networked environments. To this end, a feature of the present invention is the ability to embed security information such as an encryption key and password in the Hard Drive Encryption (HHD) that is carried by the user. This enables a user to provide secured login service for interaction with the end user device (EUD) and remote databases.

If the content is found to be highly confidential, at step 620, the content will not be exported and the processes of the present invention will end. On the other hand, if the content is found to be of low confidentiality, the processes can continue with the exportation of the content, at step 625. At step 625, any of the confidential information can also be redacted, through redaction services. In additional embodiments, a secure connection can be provided, to ensure that the content is not intercepted during transmission. The content can also be encrypted, prior to exportation, e.g., provided to either a service provider, storage system or the selected candidate device.

Figure 7:
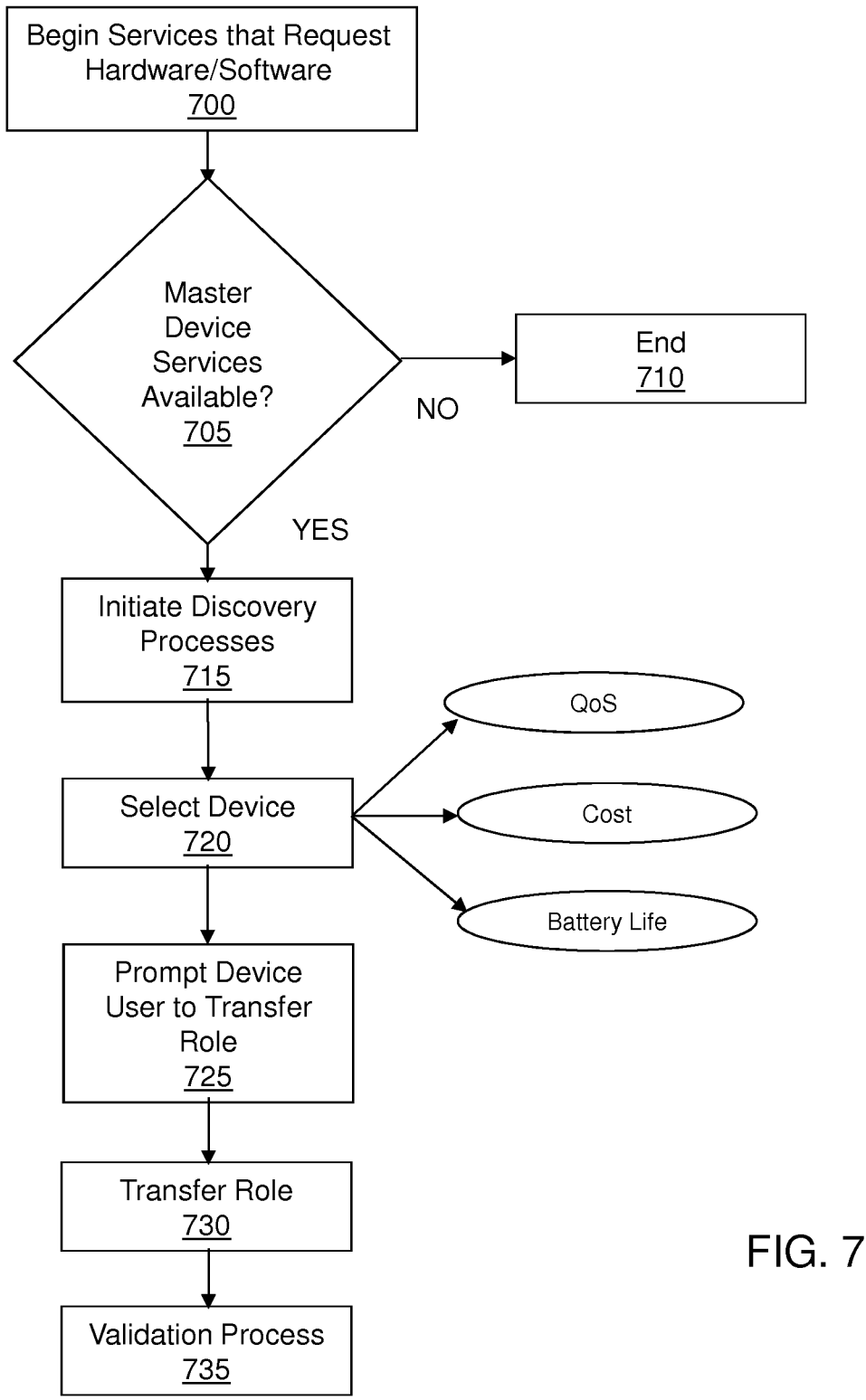
FIG. 7 shows a process for enhancing device operation using multi-point resource pooling in accordance with aspects of the present invention.

FIG. 7 shows a process for enhancing device operation using multi-point resource pooling in accordance with aspects of the present invention. The processes shown in FIG. 7, for example, describes methods by which device specific functions may be shared across a group of devices. That is, the processes of FIG. 7 show a methodology in which a set of devices may collaborate, by selecting a master device to provide the best available service (or hardware device or functionality). The "master device" becomes the service provider and the other devices become "service consumers". These several service consumers can then utilize the master device function (e.g., service, hardware device, etc), regardless of whether or not the service consumers have that same function. For example, the master device may be used to provide GPS services to other devices, via wireless communications. The master device, as described herein, may be selected based by QoS (quality of service) or capabilities that are missing from a requesting device.

More specifically, at step 700, a user of a mobile device (e.g., smart phone) begins using a mobile application that depends on hardware functionality or a service located in the mobile device (or not available in the mobile device). For example, the mobile application may include data download capabilities or GPS location services, amongst others contemplated by the present invention. In this step, the mobile device will determine whether it has the required functionality and/or services. If not, at step 705, the mobile device initiates a discovery process to find other devices (e.g., master device) nearby that can contribute to a shared resource pool. In some cases this is to locate a device that provides function that is not locally available (e.g., due to lack of network access to a service provider or lack of function specific hardware). In alternative cases, it simply is to see if a better quality option can be leveraged from another source.

If a master device is not found or is unavailable, the process ends at step 710. If a master device(s) is found, at step 715, the discovery process continues. Specifically, as already described herein, the systems and/or processes of the present invention can initiate a discovery process to determine whether any candidate master devices are available for providing the requested services and/or functionality. This may include, for example, providing a query to master devices, in addition to or alternative to the methods described with regard to, for example, FIGS. 3 and 4.

Also, in embodiments, the present invention contemplates both a push and pull process. That is, in a pull-type process, the originating device can discover and select a master device; whereas, in a push-type process, a master device can solicit its services and/or functionality (e.g., hardware) to any device. In the push-type process, the master device will discover devices with poor QoS, or missing functionality and then request whether such device(s) needs the services of the master device. The master device can perform this discovery process through a request for service signal. More specifically, the master device can broadcast a message for solicitation of its services and/or functionality. After receiving a positive response, the master device can then initiate its services and/or functionality. In embodiments, the master device may provide such services and/or functionality for a fee or other type of remuneration, e.g., incentive points, etc.

In step 720, a selection process begins. This selection process can include selecting any combination of discovered candidate master devices for use in resource sharing. Specifically, a candidate master device can be selected by several criteria including, for example:

(i) quality of service (QoS) criteria; that is, which master device can provide the best quality service; and/or (ii) cost to deliver the requested service or functionality. For example, the device owner may request remuneration for providing the service, or the service provider, provided by the potential master device, may be more expensive than other devices, which may significantly impact the selection of a master device; and/or (iii) impact on battery life or degradation of other running applications on the master device or requesting device.

In further embodiments, at step 720, a selection process can be based on each device (or some centrally hosted list available for public consumption) providing a profile. This profile can include, for example, a list of available functions, device type specific functional specifications (e.g., camera resolution, wireless data rate maximums, etc.) and/or a calculated QoS that combines the quality of the device capabilities, the current service quality and/or any cost aspects.

In embodiments, the criteria involving QoS and cost can be based on actual (e.g., real-time) QoS and cost or on a forecast of QoS and cost. For example, the QoS may be trending downward as a function of time for the previous "N" minutes, and based on this trend, the systems and/or processes of the present invention will forecast that the QoS will soon be below a threshold. In this scenario, the systems and methods of the present invention may begin a new discovery process, for selection of a different master device. Similarly, a forecast can be made with respect to other (e.g. neighboring) devices, which may not be exhibiting a rapid downward trend.

These forecasts can be made with a certain degree of confidence. If the confidence exceeds a threshold, the forecast may be considered valid and acted upon. For example, an alternative master device may be selected and triggered based on the forecast and the confidence level. If the confidence level is low, a trigger need not be triggered. However, if a confidence value is high (above threshold=T), a trigger may be initiated. A history of such QoS trends may also be monitored and stored in a database, e.g., storage system 22B.

In embodiments, the trends may be mined by service providers, device providers, and customers for a variety of purposes, including as a methods for increasing customer satisfaction, understanding gaps in coverage, understanding possible deficiencies in devices, etc. If desired, such information may be protected so that only certain parties (e.g., service providers or device manufacturers) can access such information. A service provider may be used to manage such information and to provide such information to various parties.

At step 725, systems and/or processes prompt the user of the originating device to transfer a role to the selected master device. In embodiments, this can be implemented by providing a trigger that causes the services and/or functionality to be passed to the master device.

At step 730, the originating device will transfer the role to the master device. The master device can then begin broadcasting, or makes available, the service and/or functionality to every other device that is part of the resource pool.

At step 735, a validation process begins. That is, while the master device is providing the service and/or functionality, there are several ongoing validations that continue to identify the master device. By way of illustrative, non-limiting examples:

(i) Each device monitors the locality of the master device. If the master device moves out of a viable range to remain the master device of the local devices pool, the originating device reinitiates the process of locating a group and a master device, perhaps with an interim period of self-servicing of the service and/or function;

(ii) The master device self-monitors the quality of its service. If the QoS drops below a threshold (e.g., perhaps a percentage reduction from being elected or re-elected master), the master device and/or originating device can reinitiate the process of identifying another master device. This may change the master device to another master device. Alternatively, this process may verify that the original master device can still provide the best services and/or functionality, although degraded from the original quality; and/or (iii) New devices can discover the group and identify their own QoS capabilities. The master device and/or originating device can compare the QoS to the current master device, to help determine whether a new master candidate selection process should be driven.

By way of examples, consider a scenario in which at least one user in a group of users is using their mobile device to provide GPS services to locate a common destination. Four friends or business colleagues are going to a meeting or other gathering. All their phones have GPS radios, and as these people gather in the parking lot to car pool to the meeting, etc., they all begin using applications that require a GPS signal. Once the GPS radio begins to be used, the phone of user "A" begins a discovery process that finds three of his friends (e.g., who are in his address book) are close by, and all have GPS radios in their devices. The phone of user "A" will automatically communicate with the other three phones and propose setting up a shared GPS resource pool. The other three phones agree to the shared pool and the phone of user "B" (one of the 3 other discovered phones) is elected as the Master GPS device because this phone's GPS has a higher QoS calculation based on device quality and current service (e.g., number of satellites found for example). The other three phones then turn off their GPS radios and begin to receive the GPS signal of user "B" over a Wi-Fi, Global System for Mobile Communications (GSM) or other communication mechanism. The phone of user "A" is still able to use the mapping software and show accurate real time location data even though it does not have the GPS radio turned on. Thus, three people are benefiting from the best GPS signal available as well as saving energy by not having the GPS radio turned on. Next, ten minutes into the trip, the shared resource pool transfers the "master phone role" from user "B" to user "C" when the device of user "B" is placed in a shielded location in the vehicle and losses one or more satellites thus degrading the service. Now the phone of user "C" turns on its GPS and begins broadcasting to the other three members of the GPS resource pool. As such, this scenario is based on the quality of service being used as a trigger for resource changing, resource sharing, etc. For example, the phone of user "C" may be able to acquire and lock in a GPS signal much more quickly than the others and this could be the evaluation that causes this phone to be elected the master device.

By way of another example, consider the scenario in which user "A" is using a first mobile device that does not have a camera. User "A" downloads an application on the first mobile device that can benefit from the presence of a camera. The first mobile device either has prior knowledge or discovers a second mobile device which has a camera. The first mobile device offers to pair with the second mobile device to make use of the camera. Of course, the second mobile device can offer its functionality to the first mobile device, as well. This example can extend hardware available on neighboring devices to a current device. This feature allows for utilization of many features that are available in other devices (any device).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
   a CPU, a computer readable memory and a computer readable storage media;
   first program instructions to initiate a discovery process to find devices that can contribute to a shared resource pool;
   second program instructions to select a discovered candidate master device for providing a requested functionality for use in the shared resource pool based on impact on battery life of the selected candidate master device;
   third program instructions to transfer a role to the selected candidate master device; and
   fourth program instructions to provide a validation process to ensure that the selected candidate master device remains valid,
   wherein the first, second, third and fourth program instructions are stored on the computer readable storage media for execution by the CPU via the computer readable memory.

2. The computer system of claim 1, wherein the validation process comprises any one of:
   monitoring a selected candidate master device to ensure that it remains within a viable range of other devices within the shared resource pool;
   monitoring a quality of service of the selected candidate master device and, if falling below a threshold, reinitiating the discovery process for other candidate devices; and
   new devices discovering the shared resource pool, identifying their own quality of service capabilities and comparing the quality of service capabilities to that of the selected candidate master device.

3. The computer system of claim 1, wherein the selection includes selecting any combination of discovered candidate master devices for use in resource sharing based on, in addition to impact on battery life of the selected candidate master device, at least one of:
   (i) quality of service (QoS) criteria;
   (ii) cost to deliver the requested service or functionality;
   (iii) degradation of other running applications on the selected candidate master device or requesting device; and
   (iv) a list of available functions.

4. The computer system of claim 1, wherein the selection includes selecting any combination of discovered candidate master devices for use in resource sharing based on a profile of each of the devices that can contribute to the shared resource pool.

5. The computer system of claim 1, wherein the transferring of the role to the selected candidate master device comprises the requested functionality being passed to the selected candidate master device.

6. The computer system of claim 1, wherein the initiation of the discovery process to find the devices that can contribute to the shared resource pool comprises providing a query to the devices for the requested functionality.

7. The computer system of claim 1, wherein the initiation of the discovery process to find the devices that can contribute to the shared resource pool comprises determining whether each of the devices provides the requested functionality at or above a predetermined threshold.

8. A method implemented in a computer infrastructure having computer executable code tangibly embodied in a non-transitory computer readable storage medium having programming instructions configured to:
   initiate a discovery process to find at least one device that can contribute to a shared resource pool;
   select a discovered candidate master device for providing a requested service for use in the shared resource pool based on impact on battery life and degradation of other running applications of the selected candidate master device; and
   transfer a role to the selected candidate master device.

9. The method of claim 8, wherein the selecting includes selecting the discovered candidate master device for use in resource sharing based on, in addition to impact on battery life and degradation of other running applications of the selected candidate master device, at least one of:
   (i) quality of service (QoS) criteria;
   (ii) cost to deliver the requested service or functionality; and
   (iii) a list of available functions.

10. The method of claim 9, wherein the transferring of the role to the selected candidate master device comprises the requested service being passed to the selected candidate master device.

11. The method of claim 9, wherein the initiation of the discovery process to find the at least one device that can contribute to the shared resource pool comprises providing a query to the at least one device for the requested service.

12. The computer system of claim 1, wherein the validation process is based on a locality of the selected candidate master device.

* * * * *